United States Patent
Wilson

(10) Patent No.: US 8,671,038 B2
(45) Date of Patent: *Mar. 11, 2014

(54) SPENDING VEHICLES FOR PAYMENTS

(71) Applicant: H&R Block Tax Services LLC, Kansas City, MO (US)

(72) Inventor: Robert D. Wilson, Shawnee, KS (US)

(73) Assignee: H&R Block Tax Services LLC, Kansas City, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 13/709,987

(22) Filed: Dec. 10, 2012

(65) Prior Publication Data

US 2013/0110714 A1 May 2, 2013

Related U.S. Application Data

(63) Continuation of application No. 12/710,169, filed on Feb. 22, 2010, now Pat. No. 8,332,289, which is a continuation of application No. 11/423,824, filed on Jun. 13, 2006, now Pat. No. 7,668,764, which is a continuation of application No. 09/483,537, filed on Jan. 14, 2000, now Pat. No. 7,072,862, and a continuation-in-part of application No. 09/354,870, filed on Jul. 16, 1999, now Pat. No. 7,177,829.

(51) Int. Cl.
*G06Q 40/00* (2012.01)

(52) U.S. Cl.
USPC .................................. 705/31; 705/35

(58) Field of Classification Search
USPC ............. 235/379; 705/35, 36 R, 36 T, 39, 40, 705/14.1, 31
See application file for complete search history.

(56) References Cited

U.S. PATENT DOCUMENTS

| | | | | |
|---|---|---|---|---|
| 3,596,256 A | * | 7/1971 | Alpert et al. | 710/45 |
| 5,420,926 A | * | 5/1995 | Low et al. | 705/74 |
| 5,724,523 A | * | 3/1998 | Longfield | 705/35 |
| 5,745,706 A | * | 4/1998 | Wolfberg et al. | 705/35 |
| 5,787,405 A | * | 7/1998 | Gregory | 705/45 |
| 5,926,800 A | * | 7/1999 | Baronowski et al. | 705/35 |
| 6,347,305 B1 | * | 2/2002 | Watkins | 705/26.35 |
| 6,546,373 B1 | * | 4/2003 | Cerra | 705/19 |

(Continued)

OTHER PUBLICATIONS

Kemp, "Discover Debuts Its First Platinum card", DM News, Jan. 4, 1999, p. 2.*

(Continued)

*Primary Examiner* — Kelly Campen
(74) *Attorney, Agent, or Firm* — Erise IP, P.A.

(57) ABSTRACT

A system and method for associating payments with spending vehicles so that an individual who is entitled to receive periodic or special payments such as social security checks receives in place of the payment a spending vehicle such as a discount card, rebate, or coupon for use with purchases of the sponsor's products or services. Sponsors include companies and organizations interested in offering purchase incentives to their customers. An individual who wishes to receive a spending vehicle rather than the regular payment selects the spending vehicle he or she would like to receive. The individual then assigns his or her right to receive the payment to a third party. The third party then arranges to give a spending vehicle to the individual and to transfer the individual's payment to the sponsor of the spending vehicle. The third party may take a portion of the payment as compensation for the service.

22 Claims, 5 Drawing Sheets

(56) References Cited

U.S. PATENT DOCUMENTS

| | | | |
|---|---|---|---|
| 6,625,582 B2 * | 9/2003 | Richman et al. | 705/35 |
| 6,829,588 B1 * | 12/2004 | Stoutenburg et al. | 705/30 |
| 7,010,507 B1 * | 3/2006 | Anderson et al. | 705/31 |
| 7,072,862 B1 * | 7/2006 | Wilson | 705/31 |
| 7,127,425 B1 * | 10/2006 | Wilson | 705/38 |
| 7,177,829 B1 * | 2/2007 | Wilson et al. | 705/31 |
| 2007/0050277 A1 * | 3/2007 | Wilson | 705/35 |
| 2007/0136160 A1 * | 6/2007 | Wilson et al. | 705/31 |

OTHER PUBLICATIONS

"Dicover's Platinum May Stand Out in the Platinum Crowd", Credit Card News, Jan. 15, 1999.*

* cited by examiner

SPENDING VEHICLES FOR PAYMENTS

RELATED APPLICATIONS

This application is a continuation, and claims priority benefit with regard to all common subject matter, of U.S. patent application Ser. No. 12/710,169, filed Feb. 22, 2010, entitled "Spending Vehicles for Payments," and which issued Dec. 11, 2012, as U.S. Pat. No. 8,332,289 ("the '289 patent"). The '289 patent is a continuation, claiming priority benefit with regard to all common subject matter, of U.S. patent application Ser. No. 11/423,824, filed Jun. 13, 2006, entitled "Spending Vehicles for Payments," and which issued Feb. 23, 2010, as U.S. Pat. No. 7,668,764 ("the '764 patent"). The '764 patent is a continuation, claiming priority benefit with regard to all common subject matter, of U.S. patent application Ser. No. 09/483,537, filed Jan. 14, 2000, entitled "Spending Vehicles for Payments," and which issued Jul. 4, 2006, as U.S. Pat. No. 7,072,862.

The '764 patent, to which the present application claims priority, is a continuation-in-part, claiming priority benefit with regard to all common subject matter, of U.S. patent application Ser. No. 09/354,870, filed Jul. 16, 1999, entitled "Tax Refund System," and which issued Feb. 13, 2007, as U.S. Pat. No. 7,177,829.

The earlier filed patents are hereby incorporated by reference in their entirety into the present application.

BACKGROUND AND SUMMARY

The present invention relates generally to a system and method for distributing payments to individuals and, more particularly, to a system and method for allocating a portion or all of an individual's payment into a spending vehicle.

Participants in many government and corporate sponsored programs are entitled to regular or periodic payments. For example, in government sponsored welfare programs such as Aid to Dependent Children and retirement programs such as Social Security, beneficiaries may receive monthly payments. Individuals who make regular IRA contributions during their working years may receive monthly or yearly distributions during their retirement years. Employees who participate in their employers' retirement programs such as 401(K) plans, may also receive monthly or yearly distributions during their retirement years. Individuals who participate in other savings and investment plans may receive regular or periodic dividend payments.

Individuals who receive periodic or regular payments from various government and corporate plans or programs typically receive a check from the plan or program administrator. Alternatively, individuals may arrange for an electronic funds transfer ("EFT") payment. In either case, the individuals receive cash payments. Individuals are then free to use the cash as desired.

Although the cash payments provide individuals with flexibility in making purchases, the overall purchasing power available to the individuals is equivalent to the dollar amount of cash payment. Alternatives to cash payments could provide individuals with increased purchasing power. For example, if instead of receiving a cash payment, an individual had the option of receiving a coupon from a retailer for an amount greater than the value of the cash payment, the individual would receive the benefit of increased purchasing power. Therefore, there is a need for a system and method by which individuals may select among alternatives to receiving cash payments.

The present invention provides a system and method for associating payments with spending vehicles so that an individual who is entitled to receive regular or periodic payments (e.g., Social Security checks, 401(k) distributions, dividend payments, tax refunds, payroll checks or deposits, private payment arrangements, or any other source of payment(s)) may choose to receive in place of the payment a spending vehicle such as a credit card, debit card, e-wallet account, gift card, discount card, rebate, coupon for use with purchases of the sponsor's products or services, or anything of value to the payee which the payee agrees to accept in this form instead of receiving a regular payment by check or cash or by direct deposit. Sponsors may include companies and organizations interested in offering purchase incentives to their customers. For example, sponsors may be retailers, manufacturers, or service providers. An individual who wishes to receive a spending vehicle rather than the regular payment selects the spending vehicle he or she would like to receive and assigns his or her right to receive the payment to a third party. The third party assignee may be a sponsor offering a spending vehicle or it may be a financial institution that serves as intermediary between an individual and a sponsor. If a sponsor offers the spending vehicle, the sponsor arranges to give a spending vehicle to the individual in return for an assignment of the individual's right to payment. If the spending vehicle is offered by a financial institution, the financial institution then arranges to give a spending vehicle to the individual and to transfer all or a portion of the individual's payment to the sponsor of the spending vehicle. The financial institution may take a portion of the individual's payment as compensation for the service provided to the individual and the sponsor. Alternatively, the financial institution may offer its own spending vehicle or it may purchase spending vehicles from various sponsors so that only one payment for purchase of the spending vehicles is made.

In an embodiment of the present invention, the dollar value of the spending vehicle received by an individual is greater than the dollar value of the cash payment the individual would have received. Consumers of the present invention therefore benefit by increasing their purchasing power. Alternatively, the dollar value of the spending vehicle may be equivalent to or less than the dollar value of the cash payment the individual would have received. In this embodiment of the present invention, consumers benefit from the convenience of receiving a spending vehicle for use with purchases at their preferred sponsors. Sponsors benefit from the present invention through increased customer bases and additional traffic. They further benefit from increased sales of their products and services. Payors who make payments available to individuals benefit from an increase in the use of electronic funds transfers and a reduction in the printing and mailing of checks to individuals.

The present invention will be described in greater detail hereinafter. The present invention is described in the form of preferred embodiments and is not to be limited to those preferred embodiments but instead shall be given the broadest scope of protection affordable under the law in view of the allowed claims.

BRIEF DESCRIPTION OF THE DRAWING FIGURES

DETAILED DESCRIPTION

Figure 1:
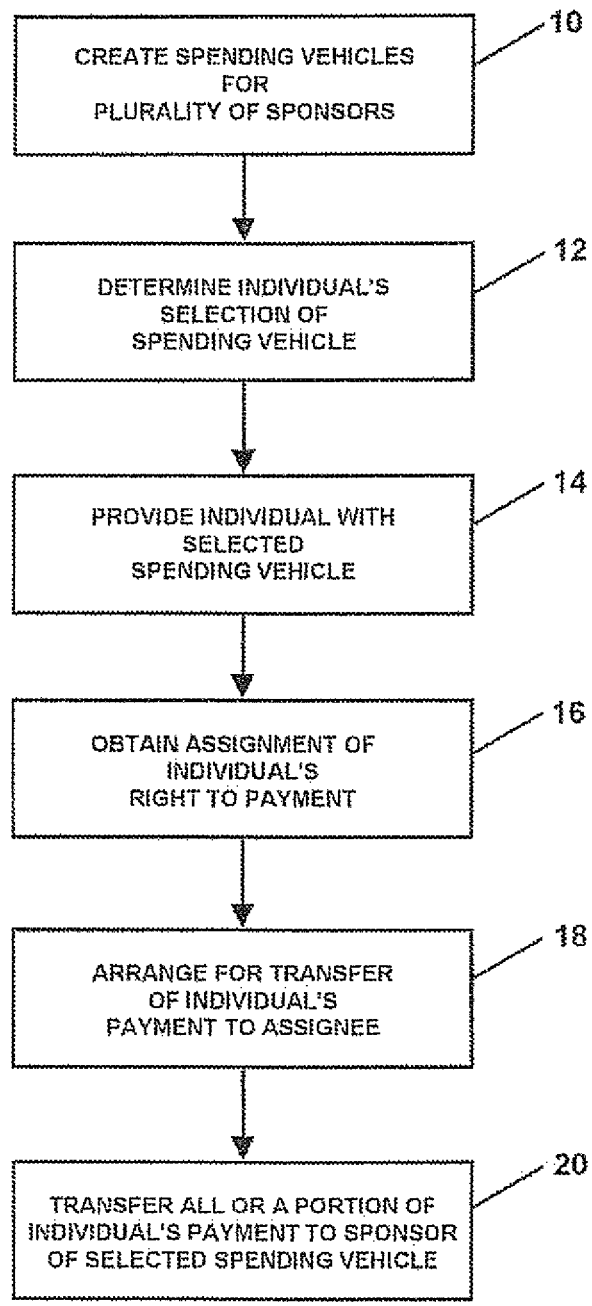
FIG. 1 is a flow diagram of an embodiment of the present invention.

Referring now to the drawings, there is shown in FIG. 1 a flow diagram for a preferred embodiment of the system of the present invention. Steps to accomplish a preferred embodiment of the present invention are shown in FIG. 1. In the first step 10, a plurality of spending vehicles for a plurality of sponsors is created. A spending vehicle may be a credit card, debit card, cash card, checking card, spending account, checking account, e-wallet account, gift card, discount card, rebate, coupon, voucher or any other type of financial instrument or currency that enables the holder of the spending vehicle to purchase products or services. A sponsor may be a retailer, financial institution, service provider, wholesaler, distributor, manufacturer, entertainment entity, travel entity, publisher, governmental entity, insurance institution, brokerage institution, global computer network and online business, consortium of companies, or any participating entity through which an individual may purchase something of value to the individual. A sponsor participating in the system and method of the present invention may choose to offer one or more spending vehicles to its customers.

In the next step 12, the individual's selection of a spending vehicle is determined. The individual may be given the option of selecting more than one spending vehicle from one or more sponsors. Next 14, the individual is provided with the spending vehicle or vehicles selected. In exchange for the spending vehicle, the individual assigns his or her right to a payment to a third party in step 14. In one embodiment of the present invention, the individual assigns his or her right to payment directly to the sponsor who provided the spending vehicle. The individual may arrange to transfer the full amount or less than the full amount of the payment to the sponsor. The sponsor then provides one or more of its own spending vehicles to the individual with a value based on the amount of the payment assigned to the sponsor. In this embodiment, the sponsor provides a spending vehicle to the individual directly without the need of an intermediate entity such as a financial institution. The sponsor may be a financial institution. Alternatively, the individual may assign his or her right to payment to a financial institution. In this embodiment of the present invention, the financial institution may serve as an intermediary between a plurality of sponsors and an individual. The financial institution may then offer more types of spending vehicles from more sponsors thereby giving the individual more options than may be available from a single sponsor. Once the assignment is complete, the assignee of the individual's right to payment, (e.g., the sponsor or financial institution) arranges to receive the individual's payment in step 18. In step 20, if an intermediary such as a financial institution is the assignee of the right to payment, a portion or all of the payment may then be transferred to the sponsor or sponsors from whom the individual selected the spending vehicle. In order to accomplish the transfer of funds, a third party payor may arrange to transfer the individual's payment to a sponsor or financial institution entitled to receive the individual's payment based on the assignment.

Figure 2:
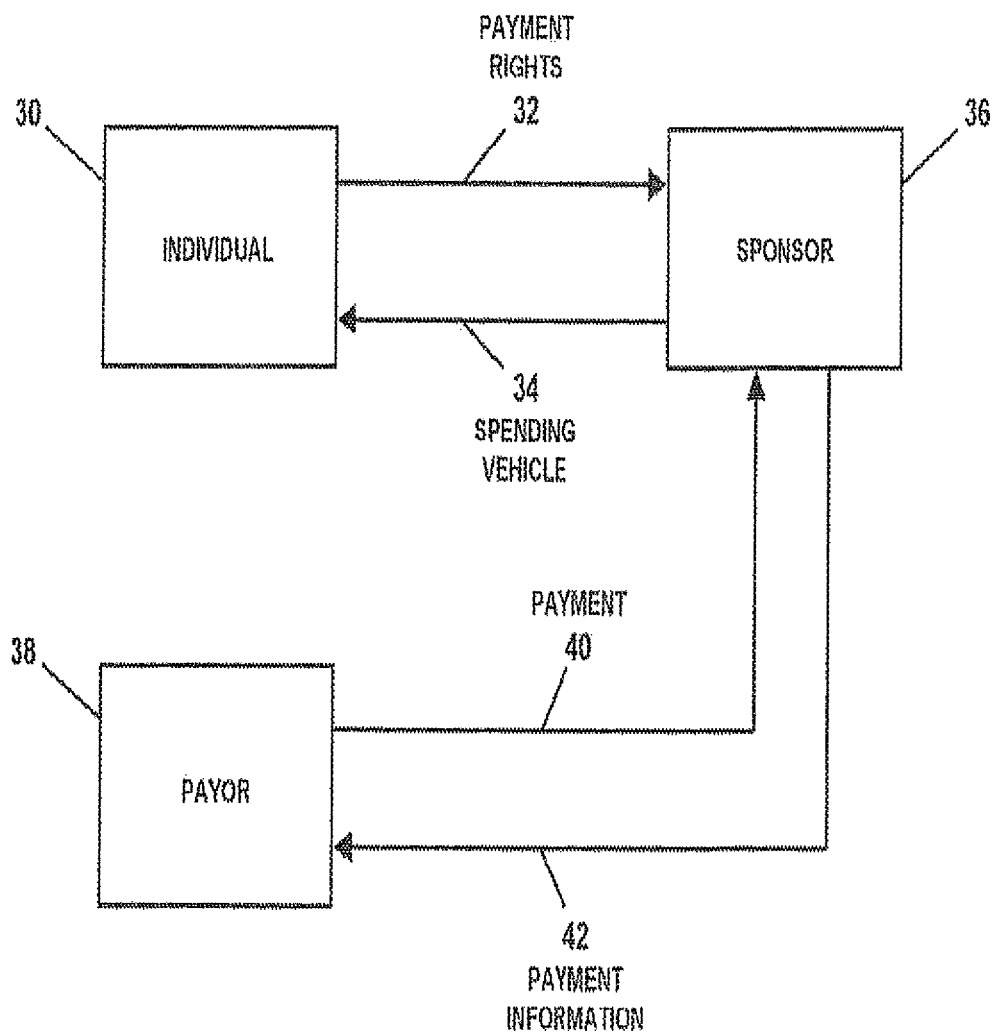
FIG. 2 is a schematic diagram of a first embodiment of the present invention.

Referring to FIG. 2, an embodiment of the present invention in which an individual 30 obtains a spending vehicle 34 directly from a spending vehicle provider such as a sponsor 36 is shown. In exchange for the assignment of the payment rights 32 by the individual 30 to the sponsor 36, the spending vehicle provider or sponsor (i.e., third party assignee) provides a spending vehicle 34 to the individual 30. Information regarding the arrangement between the individual 30 and sponsor 36 may then be communicated with the third party payor from whom the individual is entitled to receive a payment. Payment information 42 such as name and account information may be transferred from the sponsor 36 to the third party payor 38 so that the sponsor 36 receives the individual's payment 40 directly. The payor may use electronic funds transfer to accomplish the transfer so that it is not required to process a check or other form of payment to the individual.

In accordance with the present invention, for example, an individual may assign his or her Social Security check to a retailer and in exchange for the right to receive the individual's check, the retailer provides the individual with a spending vehicle such as a credit card or debit card with a predetermined amount of spending power for use at various outlets. The retailer spending vehicle may include an amount of buying power greater than the amount of the Social Security check. For example, a retailer may issue a special debit card worth $500 in exchange for receiving the individual's check of $450. The benefit to the retailer is that the individual must spend his or her Social Security dollars at the retailer's store(s), and the benefit to the individual may be that the retailer offers buying power at the retailer's store(s) in excess of the dollar amount of the Social Security check.

Under a preferred embodiment of the present invention, the spending vehicle provider or sponsor may issue, for example, a debit card to an individual upon receiving confirmation of the receipt of the Social Security check. The credit card or debit card may not be activated until such time as the spending vehicle provider receives the funds for the check. The spending vehicle may include a telephone number for an individual to call to activate the spending vehicle once the spending vehicle provider is assured of receipt of payment. Once the individual's spending vehicle is activated, the individual may spend the value of the spending vehicle. For example, an individual who is entitled to receive a $450 Social Security check may assign that amount to a spending vehicle provider in exchange for $500 of spending power through a debit card good only at a particular retailer or at some group of retailers. In another example, an individual who is due an IRA distribution of $2,500 may assign his or her distribution amount to an automobile dealer in exchange for the automobile dealer issuing a spending vehicle worth $3,000 in buying power at the auto dealership. In another example, a cruise line may offer a spending vehicle of $3,000 in exchange for receiving the individual's distribution amount of $2,500.

The spending vehicle may take the form of many different embodiments, including but not limited to, credit cards, debit cards, cash cards, checking cards, spending accounts, checking accounts, electronic spending accounts, coupons, vouchers, discount certificates, rebate certificates, and any other vehicle in which an individual receives spending power in a particular dollar amount useable at practically any participating retailer, financial institution, service provider, wholesaler, distributor, manufacturer, entertainment entity, travel entity, publisher, governmental entity, insurance institution, brokerage institution, global computer network and online business, and any participating entity through which an individual may purchase something of value to the individual. A payment may be any type of regular or periodic payment such as a government, corporate, or employer benefit. It may also be a special one-time payment such as a tax refund or a special dividend payment from an investment.

Figure 3:
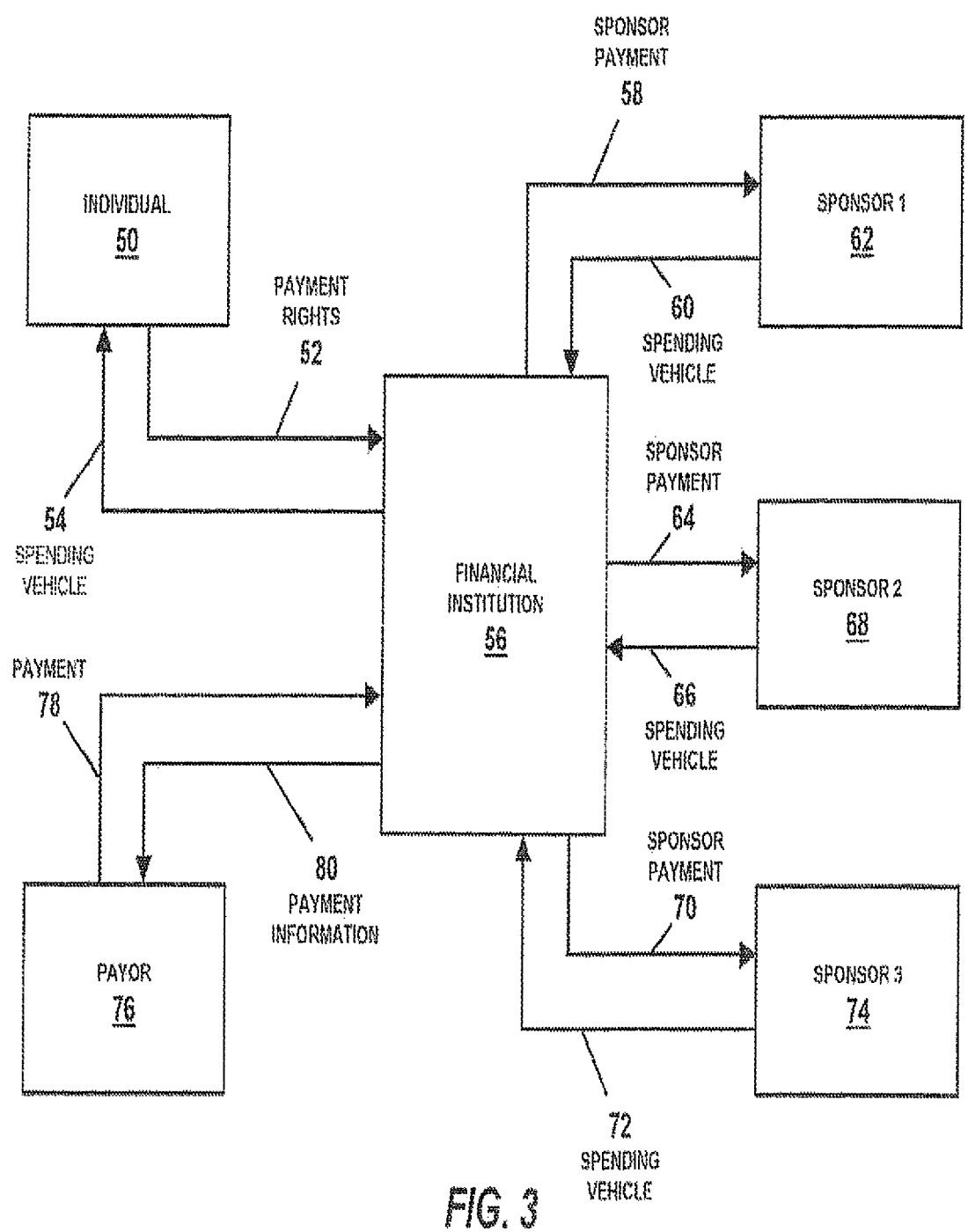
FIG. 3 is a schematic diagram of a second embodiment of the present invention.

Referring to FIG. 3, use of a financial institution 56 as an intermediary or middleman between the individual 50, the payor 76 from whom the individual 50 is entitled to receive a payment, and the spending vehicle provider(s) or sponsor(s) 62, 68, 74 may be preferable. For example, financial institutions are typically well established in providing spending vehicles such as credit cards and debit cards. A retailer, for example, may find it helpful to provide its own spending vehicle if done in conjunction with a financial institution.

As shown in FIG. 3, a financial institution 56 may work with a plurality of sponsors 62, 68, 74 so that an individual 50 is provided with several options for selecting a spending vehicle. The financial institution 56 may arrange to obtain a plurality of spending vehicles 60, 66, 72 from a plurality of sponsors 62, 68, 74. As indicated above, the spending vehicles 60, 66, 72 may be credit cards, debit cards, cash cards, checking cards, spending accounts, checking accounts, electronic spending accounts, coupons, vouchers, discount certificates, or rebate certificates. The individual 50 assigns his or her payment rights 52 to a financial institution 56 and selects one or more spending vehicles 54 from one or more of the sponsors 62, 68, 74. The individual may assign the full or less the full amount of the payment to the financial institution. The financial institution may arrange to receive the appropriate amount of the individual's payment 78 by providing payment information 80 to the third party payor 76 from whom the individual is entitled to receive a payment. As indicated above, the payor 76 may be a governmental agency, an employer, or any institution that provides payments to individuals in accordance with instructions from a governmental agency, corporation, organization, employer, etc. The payment 78 may be a Social Security check, 401(k) distribution, dividend payment, tax refund, etc. The financial institution 56 may then arrange to transfer to each participating sponsor 62, 68, 74 all or a portion of the individual's payment 78. The financial institution 56 may keep a portion of each individual's payment as a fee for allowing sponsor participation. Preferably, the value of the spending vehicle 54 selected by the individual 50 exceeds the value of the payment right 52 transferred to the financial institution. In this arrangement, individuals benefit from the increased spending power available from the various sponsors. While financial institutions may be beneficial to the process of the present invention, they are not essential.

Figure 4:
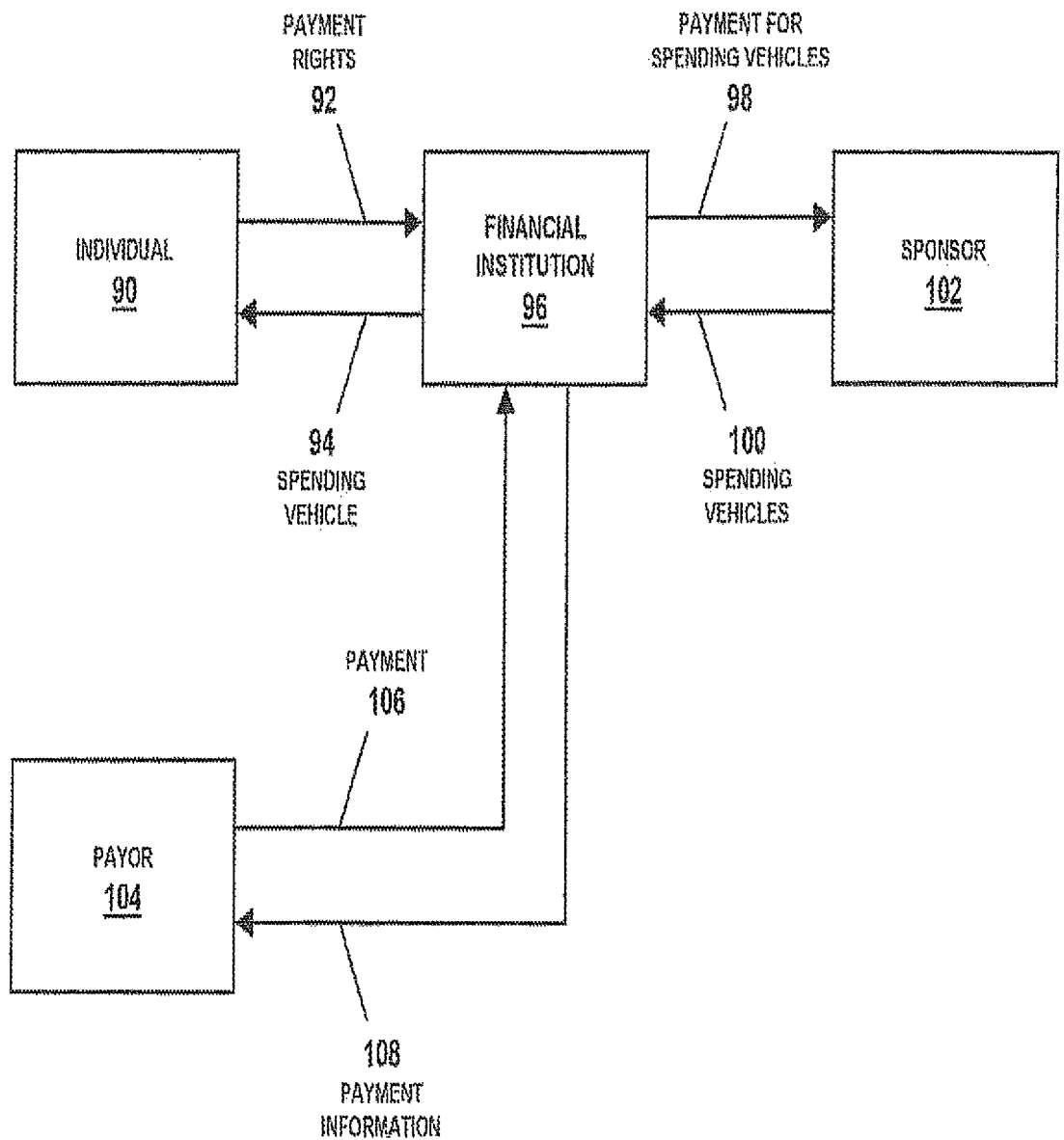
FIG. 4 is a schematic diagram of a third embodiment of the present invention.

FIG. 4 shows another embodiment of the present invention in which a financial institution 96 purchases spending vehicles from a sponsor 102. In this embodiment of the present invention, a financial institution 96 may make a payment of a lump sum or fixed amount 98 to a sponsor 102 in return for a plurality of spending vehicles 100. The financial institution 96 may then distribute one of the spending vehicles 94 to an individual 90 in exchange for the right to receive a payment 92 from the individual or individual's payor 104. Payment information 108 provided by the financial institution 96 to the payor 104 may then be used to transfer the individual's payment 106 directly to the financial institution 96. An electronic funds transfer may be used to complete the transaction so the payor is relieved of the burden of processing a check payment to the individual.

In accordance with this embodiment of the present invention, a financial institution 96, for example, may purchase $5,000 worth of coupons for $4,000. The financial institution 96 may then sell the coupons to individuals for slightly less than the face value of each coupon but for more than it paid for each coupon. Under this arrangement, the sponsor benefits from the lump sum payment and increased sales due to the distribution of the coupons to potential customers while the financial institution benefits by selling the coupons for less than its purchase price. Individuals benefit from the increased spending power at the participating sponsor. In addition, the financial institution is not required to transfer any portion of the individual's payment to the sponsor.

Figure 5:
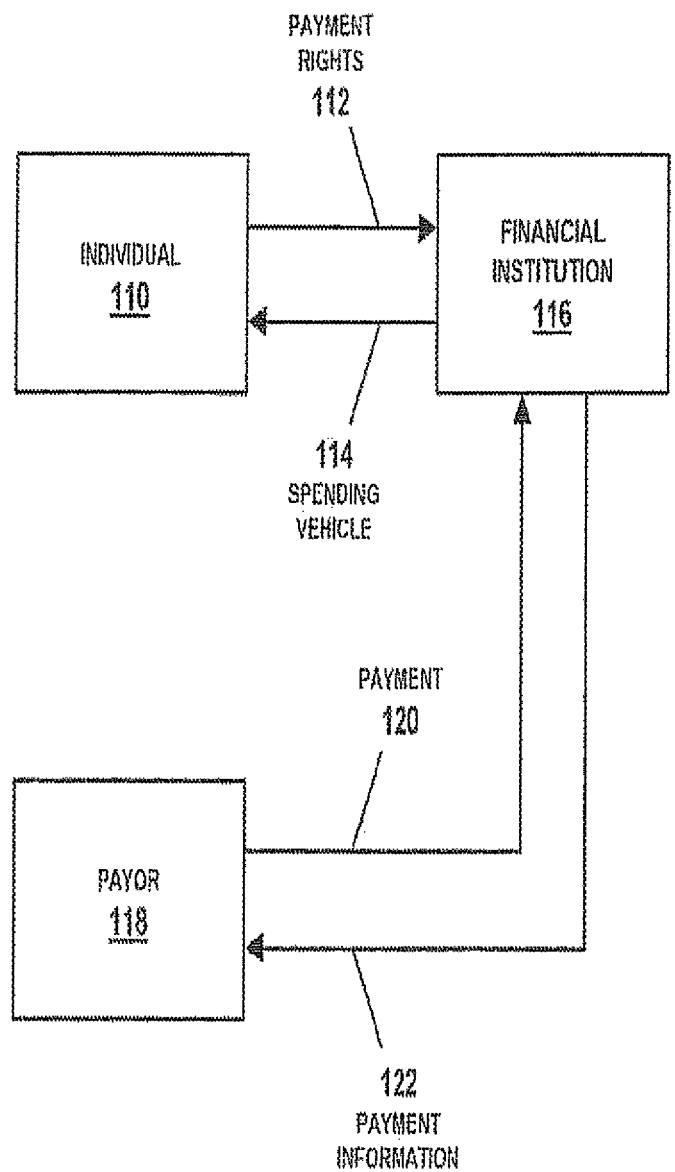
FIG. 5 is a schematic diagram of a fourth embodiment of the present invention.

FIG. 5 shows another embodiment of the present invention in which a particular third party spending vehicle provider is not necessary. Instead, a financial institution 116 (perhaps the bank where the individual banks), for example, issues a spending vehicle 114 directly to the individual 110 that may be used at many different outlets for the purchase of goods and or services. In return for the spending vehicle 114, the individual 110 assigns payment rights 112, which may be any amount equal to or less than the amount of the payment, directly to the financial institution 116. The financial institution 116 receives the appropriate amount for the individual's payment 120 from the third party payor 118 after providing necessary payment information 122 to the payor 118. The payment information may include name and account information so that an electronic funds transfer may be completed.

Once the individual receives the spending vehicle and the individual has completed any process for activating the spending vehicle, the individual may spend the dollar amount of value inherent in that individual's spending vehicle through participating sponsor or sales outlets. Furthermore, the spending vehicle provider or sponsor may agree to assign its rights and obligations in the spending vehicle to another entity at which the individual may spend or obtain the unspent dollar amount of the spending vehicle. The individual is therefore given even greater flexibility in using the selected spending vehicle.

Once the spending vehicle is activated for the individual, in a preferred embodiment of the present invention, the individual may be given a period of time in which to use the spending vehicle before a service charge is applied. For example, the individual may incur no service charge on the spending vehicle if the spending vehicle is used within 90 days of being activated. In the event a minimum balance remains in the spending vehicle after the initial "no fee" period, a small monthly service charge may be levied against the spending vehicle until it is entirely used. Alternatively, after a period of time (e.g., 60 days) the spending vehicle provider may issue a check to the individual for the balance left in the spending vehicle. These alternatives provide the individual with greater flexibility in using the selected spending vehicle.

Having shown and described a preferred embodiment of the present invention, those skilled in the art will realize that many variations and modifications may be made to the described invention and still be within the scope of the claimed invention. Thus many of the elements indicated above may be altered or replaced by different elements which will provide the same or substantially the same result and fall within the spirit of the claimed invention. It is the intention therefore to limit the invention only as indicated by the scope of the claims.

The invention claimed is:
1. A computerized method comprising the steps of:
receiving information indicative of a government payment payable by a government authority to a payee;
receiving information indicative of a selection by the payee to associate at least a portion of the government payment with a spending vehicle;

receiving information indicative of an assignment of right from the payee entitling a third-party payor to retain at least a portion of the associated government payment;

determining, via a processor, a load amount to be loaded on to the spending vehicle, with the load amount based on the portion of the government payment assigned to the third-party payor; and causing, via a processor, the spending vehicle to be loaded with the load amount.

2. The method of claim 1, wherein upon loading, the funds corresponding to the load amount are immediately accessible by the payee.

3. The method of claim 1, wherein the loading of the load amount on the spending vehicle is not subject to a loan agreement pursuant to regulatory banking laws between the payee and the third-party payor.

4. The method of claim 1, wherein said assignment of right entitles the third-party payor rather than the payee to receive the retained portion of the associated government payment in exchange for issuing said spending vehicle.

5. The method of claim 1, wherein the spending vehicle is selected from the group consisting of: a pre-paid credit card and a debit card.

6. The method of claim 1, wherein the government payment is selected from the group consisting of: a tax refund payment and a social security payment.

7. The method of claim 6, wherein the associated government payment is received from the government authority via an electronic transfer.

8. The method of claim 1, wherein the load amount is equal to the portion of the government payment assigned to the third-party payor.

9. The method of claim 1, wherein the load amount is less than the portion of the government payment assigned to the third-party payor.

10. A non-transitory computer readable storage medium with an executable program stored thereon for associating government payments with spending vehicles, wherein the program instructs the processor to perform the following steps:

receive information indicative of a government payment payable by a government authority to a payee;

receive information indicative of a selection by the payee to associate at least a portion of the government payment with a spending vehicle;

receive information indicative of an assignment of right from the payee entitling a third-party payor to retain at least a portion of the associated government payment;

determine a load amount to be loaded on to the spending vehicle, with the load amount based on the portion of the government payment assigned to the third-party payor; and cause the spending vehicle to be loaded with the load amount.

11. The computer readable medium of claim 10, wherein the loading of the load amount on the spending vehicle is not subject to a loan agreement pursuant to regulatory banking laws between the payee and the third-party payor.

12. The computer readable medium of claim 10, wherein said assignment of right entitles the third-party payor rather than the payee to receive the retained portion of the associated government payment in exchange for issuing said spending vehicle.

13. The computer readable medium of claim 10, wherein the load amount is equal to the portion of the government payment assigned to the third-party payor.

14. The computer readable medium of claim 10, wherein the load amount is less than the portion of the government payment assigned to the third-party payor.

15. A non-transitory computer readable storage medium with an executable program stored thereon for associating payments with spending vehicles, wherein the program instructs the processor to perform the following steps:

receive information indicative of a payment payable by a payor to a payee;

receive information indicative of a selection by the payee to associate at least a portion of the payment with a spending vehicle;

receive information indicative of an agreement from the payee to receive funds loaded on the spending vehicle in exchange for a third-party payor receiving the associated payment;

upon receipt of said information indicative of an agreement from the payee, notify the payor to deposit the associated payment in an account other than an account held by the payee or an account associated with the spending vehicle;

determine a load amount to be loaded on to the spending vehicle, with the load amount based on the portion of the payment assigned to the third-party payor; and cause the spending vehicle to be loaded with funds representing the associated payment.

16. The computer readable medium of claim 15, wherein the loading of the load amount on the spending vehicle is not subject to a loan agreement pursuant to regulatory banking laws between the payee and the third-party payor.

17. The computer readable medium of claim 15, wherein the load amount is equal to the portion of the payment assigned to the third-party payor.

18. The computer readable medium of claim 15, wherein the load amount is less than the portion of the payment assigned to the third-party payor.

19. A non-transitory computer readable storage medium with an executable program stored thereon for associating payments with spending vehicles, wherein the program instructs the processor to perform the following steps:

receive information indicative of an electronic payment payable by a payor to a payee;

receive information indicative of a selection by the payee to associate at least a portion of the payment with a spending vehicle;

receive information indicative of an agreement from the payee to receive funds loaded on the spending vehicle in exchange for a third-party payor receiving the associated payment;

determine a load amount to be loaded on to the spending vehicle, with the load amount based on the portion of the payment assigned to the third-party payor; and cause the spending vehicle to be loaded with the load amount.

20. The computer readable medium of claim 19, wherein the loading of the load amount on the spending vehicle is not subject to a loan agreement pursuant to regulatory banking laws between the payee and the third-party payor.

21. The computer readable medium of claim 19, wherein the load amount is equal to the portion of the payment assigned to the third-party payor.

22. The computer readable medium of claim 19, wherein the load amount is less than the portion of the payment assigned to the third-party payor.

* * * * *